April 30, 1963 M. J. CIESIELSKI 3,087,438
HEAT PUMP
Filed Oct. 26, 1960
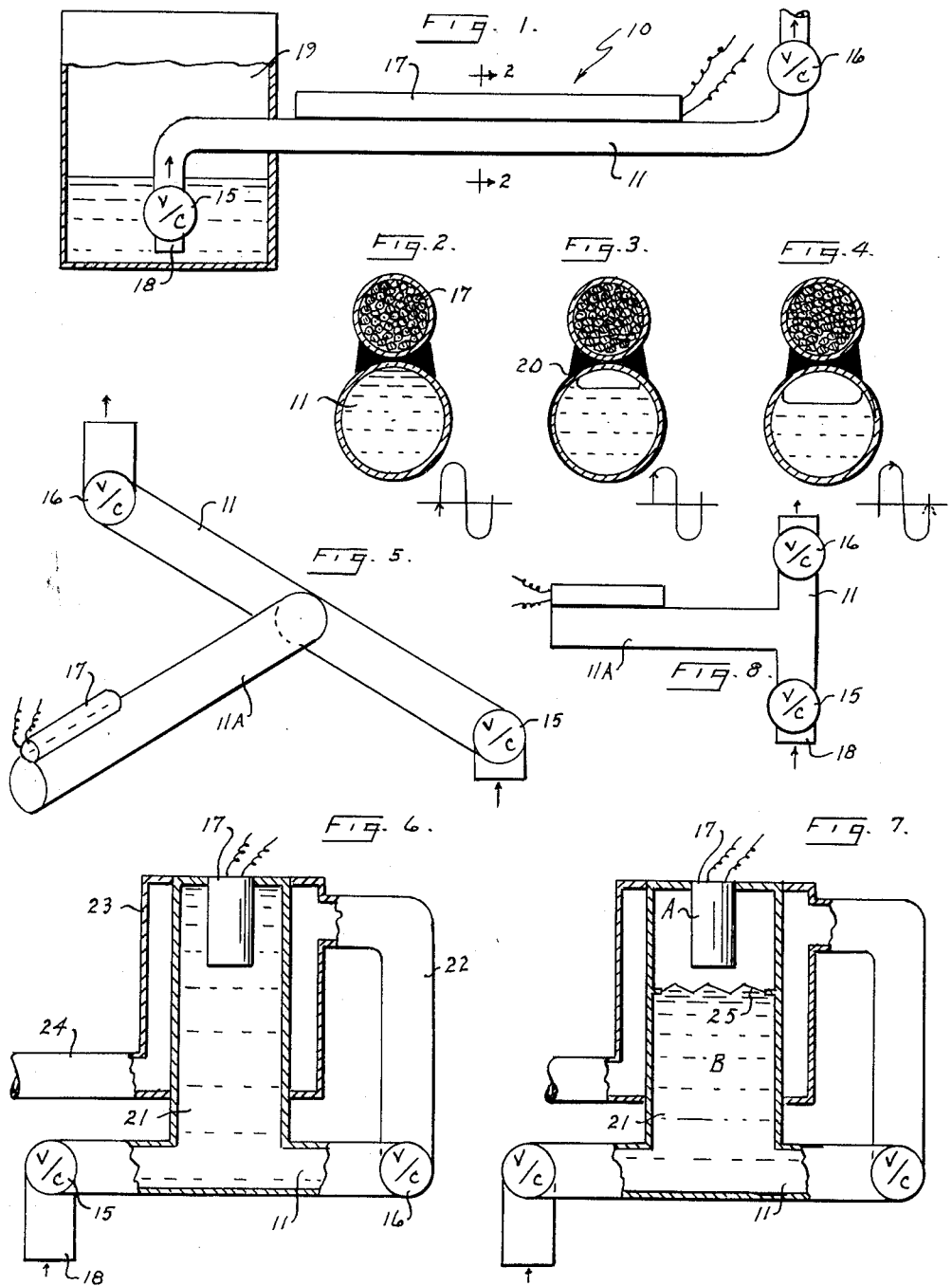
INVENTOR
MECISLAUS JOSEPH CIESIELSKI
BY
Howard J. Jeandron
AGENT

United States Patent Office 3,087,438
Patented Apr. 30, 1963

3,087,438
HEAT PUMP
Mecislaus J. Ciesielski, 239 Broad St., Keyport, N.J.
Filed Oct. 26, 1960, Ser. No. 65,033
6 Claims. (Cl. 103—255)

This invention relates to the motive power of heat, and more particularly to the production of this motive power in a heat actuated fluid pump or motor.

Part of the principle involved may be shown, for example, in a hot water boiler in which the application of heat to the fluid produces a circulation in which the hot fluid rises and is expelled through an outlet while the colder fluid is drawn from an inlet in the bottom. This phenomena is produced with just atmospheric pressure on the water supply, as heat produces an expansion and circulation. Also of interest is the action of a still, the liquid may be boiled in a container and the steam will be forced upward and outward into a tube and then condense and drop in a pure form into a second container. These principles are utilized in this invention; however, the principle of this invention was quite clearly defined by a French scientist Sadi Carnot back in 1824, this may be found in various engineering books and is quoted in Encyclopedia Britannica, vol. 11, page 320, wherein Carnot defines this principle as "the motive power obtainable from heat is independent of the agents employed to realize it. The efficiency is fixed solely by the temperatures of the bodies between which, in the last resort, the transfer of heat is effected," and further he proposed an ideal engine operating on a cycle (since called the Carnot cycle) which has the highest possible efficiency for the temperature limits within which it operates. Using the concept of absolute temperature, Carnot was able to show that the ideal efficiency of any heat engine operating between the temperature limits $T_1$ and $T_2$ is $$\text{Carnot eff. (ideal engine)} = \frac{T_1 - T_2}{T_1} \quad (15\text{-}4)$$

where $T_1$ is the absolute temperature of the heat supplied to the engine and $T_2$ is the absolute temperature of the heat exhausted from the engine. A real engine does not approach Carnot's theoretical cycle of operation, and actual operating engines are always less efficient than Eq. (15-4) would indicate. Lord Kelvin (1827-1907) recognized the possibility of using an ideal heat-engine cycle to define a temperature scale which would be "absolute" in the sense that it did not depend on the thermometric substance. He suggested that temperatures on the absolute scale be defined from the relation $$\text{Eff.} = \frac{Q_1 - Q_2}{Q_1} = \frac{T_1 - T_2}{T_1} \quad (15)$$

giving $$\frac{Q_2}{Q_1} = \frac{T_2}{T_1} \quad (16)$$

This equation states that any two temperatures are in the same ratio as the heat quantities absorbed and ejected in a Carnot cycle operated between those two temperatures. Consider a Carnot cycle operating between two fixed temperatures, say, the boiling point of water (373° K.) and the freezing point (273° K.). There will be a certain area representing useful work. We can define the temperature (323° K.) midway between the boiling point and the freezing as the temperature at which a Carnot engine operating between the boiling point and the midpoint does the same work, a Carnot engine operating between the midpoint and the ice point. Obviously the interval so defined can be subdivided in the same manner, and the scale can be extended to higher or lower temperatures. The temperature at which a Carnot engine ejects no heat would be the zero on the absolute temperature scale. Absolute zero may be thought of as the sink temperature $T_2$ of a Carnot engine operating at an efficiency of 100%. The Kelvin or thermodynamic temperature scale is the same as the absolute scale determined by a perfect gas. Temperatures on this absolute scale are determined in practice with a gas thermometer, the readings being corrected for the deviation of the particular gas from the ideal gas law as calculated from certain other experiments.

*The efficiency of heat engines.*—The ideal or thermodynamic efficiency of a heat engine is defined from Eq. 15

$$\text{Ideal efficiency} = \frac{T_1 - T_2}{T_1} = 1 - \frac{T_2}{T_1} \quad (17)$$

Owing to heat losses and friction, no actual engine ever attains the efficiency defined by Eq. 17. The ideal efficiency remains as an upper limit to the efficiency of any heat engine. Heat, according to Carnot, in the type of engine we are considering, can evidently be a cause of motive power only by virtue of changes of volume or form produced by alternate heating and cooling. This involves the existence of hot and cold bodies to act as boiler and condenser, or source and sink of heat, respectively. Wherever there exists a difference of temperature, it is possible to have the production of motive power from heat; and conversely, production of motive power, from heat alone, is impossible without difference of temperature. In other words the production of motive power from heat is not merely a question of the consumption of heat, but always requires transference of heat from hot to cold. What then are the conditions which enable the difference of temperature to be most advantageously employed in the production of motive power, and how much motive power can be obtained with a given difference of temperature from a given quantity of heat?

*Carnot's rule for maximum effect.*—In order to realize the maximum effect, it is necessary that, in the process employed, there should not be any direct interchange of heat between bodies at different temperatures. Direct transference of heat by conduction or radiation between bodies at different temperatures is equivalent to wasting a difference of temperature which might have been utilized to produce motive power. The working substance must throughout every stage of the process be in equilibrium with itself (i.e., at uniform temperature and pressure) and also with external bodies, such as the boiler and condenser, at such times as it is put in communication with them. In the actual engine there is always some interchange of heat between the steam and the cylinder, and some loss of heat to external bodies. There may also be some difference of temperature between the boiler steam and the cylinder on admission, or between the waste steam and the condenser at release. These differences represent losses of efficiency which may be reduced indefinitely, at least in imagination, by suitable means, and designers had even at that date been very successful in reducing them. All such losses are supposed to be absent in deducing the ideal limit of efficiency, beyond which it would be impossible to go.

It is an object of this invention to provide a pipe or enclosing chamber in which fluid is contained and in which one end of the pipe or container is provided with an outlet check valve that may be opened by a predetermined pressure on said check valve by the expansion of the fluid while the opposite end of said pipe or chamber is provided with an inlet check valve to prevent a back flow of the fluid out of said pipe or chamber, but permitting a flow of fluid into said pipe or chamber and in which the application of a predetermined degree of heat to said pipe or chamber produces an expansion of the fluid within said pipe or chamber and in which the expansion of said fluid is of sufficient degree to open said outlet check valve and permit the escape of a portion of the fluid in said pipe or chamber.

It is a further object of this invention to provide a pipe or enclosing chamber in which fluid is contained and in which one end of the pipe or container is provided with a check valve that may be opened by a predetermined pressure on said check valve by the expansion of the fluid while the opposite end of said pipe or chamber is provided with a check valve to prevent a back flow of the fluid out of said pipe or chamber, but permitting a flow of fluid into said pipe or chamber and in which the application of a predetermined degree of heat to a predetermined portion of said pipe or chamber produces an expansion of the fluid within said pipe or chamber, and in which the expansion of said fluid is of sufficient degree to open said check valve and permit the escape of a portion of the fluid in said pipe or chamber.

It is an object of this invention to provide a pipe or enclosing chamber in which two fluids are contained and in which one end of the pipe or container is provided with an outlet check valve that may be opened by a predetermined pressure on said check valve by the expansion of the first fluid while the opposite end of said pipe or chamber is provided with an inlet check valve to prevent a back flow of a 2nd fluid out of said pipe or chamber, but permitting a flow of said 2nd fluid into said pipe or chamber and in which the application of a predetermined degree of heat to said pipe or chamber produces an expansion of the said first fluid within said pipe or chamber and a pressure on said 2nd fluid, and in which the expansion pressure on said fluid is of sufficient degree to open said outlet check valve and permit the escape of a portion of the 2nd fluid in said pipe or chamber.

It is an object of this invention to provide a pipe with a heating element in juxtaposition to the upper area of said pipe and in which fluid is contained and in which one end of the pipe or container is provided with an outlet check valve that may be opened by a predetermined pressure on said check valve by the expansion of the fluid while the opposite end of said pipe is provided with an inlet check valve to prevent a back flow of the fluid out of said pipe, but permitting a flow of fluid into said pipe and in which the application of a predetermined degree of heat to said pipe produces an expansion of the fluid within said pipe, and in which the expansion of said fluid is of sufficient degree to open said outlet check valve and permit the escape of a portion of the fluid in said pipe.

It is an object of this invention to provide an enclosing chamber of square or rectangular form in which fluid is contained and in which one end of the chamber is provided with an outlet check valve that may be opened by a predetermined pressure on said check valve by the expansion of the fluid while the opposite end of said chamber is provided with an inlet check valve to prevent a back flow of the fluid out of said chamber, but permitting a flow of fluid into said chamber and in which the application of a predetermined degree of heat to said chamber produces an expansion of the fluid within said chamber, and in which the expansion of said fluid is of sufficient degree to open said outlet check valve and permit the escape of a portion of the fluid in said chamber.

It is an object of this invention to provide a triangular enclosing chamber in which fluid is contained and in which one end of the chamber is provided with an outlet check valve that may be opened by a predetermined pressure on said check valve by the expansion of the fluid while the opposite end of said chamber is provided with an inlet check valve to prevent a back flow of the fluid out of said chamber, but permitting a flow of fluid into said chamber and in which the application of a predetermined degree of heat to said chamber produces an expansion of the fluid within said chamber, and in which the expansion of said fluid is of sufficient degree to open said outlet check valve and permit the escape of a portion of the fluid in said chamber.

It is an object of this invention to provide a pipe or enclosing chamber in which two fluids are contained, the first fluid being a low boiling point fluid for example such as (Freon 11) and the second fluid being water and in which one end of the pipe or container is provided with an outlet check valve that may be opened by a predetermined pressure on said check valve by the expansion of the first fluid while the opposite end of said pipe or chamber is provided with an inlet check valve to prevent a back flow of the second fluid out of said pipe or chamber and in which the application of a predetermined degree of heat to said pipe or chamber produces an expansion of the said first fluid within said pipe or chamber and a pressure on said second fluid, and in which the expansion pressure on said fluid is of sufficient degree to open said outlet check valve and permit the escape of a portion of the second fluid in said pipe or chamber.

Further objects of this invention shall be apparent by reference to the accompanying detailed description and the drawings, in which:

FIG. 1 is an illustration of a pipe with a check valve at either end of said pipe and a heating element mounted above said pipe to provide a pump according to this invention;

FIG. 2 is a cross sectional view of one form of the device illustrated in FIG. 1;

FIG. 3 is similar to FIG. 2, showing the application of heat and the beginning of a pumping cycle;

FIG. 4 is similar to FIG. 2, showing the limit of expansion and the end of the pumping cycle;

FIG. 5 is a further embodiment of the pump illustrated in FIG. 1, shown in perspective;

FIG. 6 is a still further embodiment of the pump illustrated in FIG. 1;

FIG. 7 is a still further embodiment of the pump illustrated in FIG. 1; and

FIG. 8 is a still further embodiment of the pump illustrated in FIG. 1.

Referring to the drawings and particularly FIG. 1, there is illustrated a device which develops motive power from heat, in its simplest form it is essentially a fluid pump 10 which is comprised of a fluid chamber 11 with an inlet check valve 15 at one end of chamber 11 and an outlet check valve 16 at the opposite end of the chamber. Mounted by a fused contact in juxtaposition to the upper surface of chamber 11 is a heater 17 which in this instance is shown as an electric heating element, however, any form of heating element may be similarly employed. An inlet port 18 of check valve 15 is submerged in a fluid supply 19. It is to be noted that contrary to all of the devices disclosed in the prior art, the boiler and condenser are combined in the single chamber 11, the source of heat is the element 17 and sink of heat is of course the fluid being pumped. The operation of the pump according to the Carnot cycle is fairly simple, in operation atmospheric pressure on the fluid in container 19 will fill the chamber 11 as the inlet check valve 15 is only effective in checking back flow out of chamber 11. Outlet check valve 16 is set to allow the escape of fluid from chamber 11 (at a predetermined pressure) but to prevent a return flow back into chamber 11. When the heater 17 is turned on the heat from element 17 will be conducted to chamber 11. The fluid in chamber 11 becomes heated and due to the concentration of heat at the top surface of chamber 11 (along the surface of contact with the heating element), there is a rapid conversion of the fluid to vapor due to boiling (as shown in FIG. 3). This vapor bubble does not form to fill chamber 11, rather it forms in the area of the greatest concentration of heat at the top of the chamber and actually converts a minimum of fluid to vapor as shown in FIG. 4. This formation of vapor causes an increase of the internal pressure and the increased pressure opens the outlet check valve and allows a pulse of fluid out of chamber 11. As the volume of vapor or steam increases (FIG. 4), there are changes taking place:

(1) The pressure will increase to a predetermined peak (when the check valve 16 unloads).

(2) The vapor formed being a poor or non-conductor of heat will therefore provide an insulating layer between the heating surface and the fluid being heated.

(3) Because of this insulating layer the heat input will no longer form vapor and this vapor or steam loosing pressure with the outlet pulse suddenly condenses and there is a drop of internal pressure, in fact, it drops below atmospheric pressure, thus permitting the inlet check valve to admit fluid until the chamber 11 is again filled, thus completing one cycle. The cycle may be followed by referring to the diagram of the pressure wave pattern that accompanies FIGS. 2, 3, and 4. The pressure of the fluid in chamber 11 (FIG. 2) is atmospheric pressure 14.7 p.s.i. indicated by the horizontal line. As heat is applied (FIG. 3) the pressure in chamber 11 increases, due to the formation of steam and as shown on the wave pattern by the arrow. The pressure increased to its peak as shown on the wave diagram (FIG. 4). When the outlet check valve unloads the pressure in chamber 11 drops according to the wave diagram, then rises with the flow of fluid through the inlet check valve until the pressure is back to atmospheric pressure (the dotted arrow) and is ready to repeat its cycle. A continuous supply of heat will produce a continuous pulsing or cycling action.

Referring to FIG. 5, there is illustrated a further embodiment of this invention in which chamber 11 is provided with a connecting chamber 11A positioned to connect with chamber 11 on a horizontal plane or at a slight angle below the horizontal plane, and in this embodiment the heater 17 is positioned adjacent the upper edge of chamber 11A. As in the prior embodiment of FIG. 1, there is an inlet check valve 15 at the one end of chamber 11 and an outlet check valve 16 at the other end of chamber 11. The operation of this embodiment of the invention is similar to the operation of the device shown in FIG. 1, however, in this embodiment, the concentration of heat within chamber 11A remains mostly within chamber 11A. The vapor pressure formed in chamber 11A effects the fluid within chamber 11 in the same manner as described in FIG. 1. However, most of the heated fluid remains trapped within chamber 11A, thus, there is less heat loss by conductivity to the fluid flowing through chamber 11. The necessary rate of heat dissipation can be controlled by varying the angular position of chamber 11A below the horizontal plane. A continuous supply of heat will also produce a recurring cycling action as in FIG. 1.

Referring to FIG. 6, there is illustrated a still further embodiment of this invention, in which the device is primarily the same as FIG. 1 where the fluid being pumped is the heat sink. In the chamber 11, the inlet check valve 15 and inlet 18 and outlet check valve 16, in addition a chamber 21 is positioned above chamber 11 and open to chamber 11 and the outlet from check valve 16 is connected by a pipe 22 to a jacket 23 surrounding chamber 21 and an outlet port 24 is provided from the jacket 23. In this embodiment the heating element is placed inside of chamber 21 and in contact with the working substance, which may be a fluid or any ideal gas filling an upper portion of chamber 21. In operation atmospheric pressure will supply fluid through inlet 18 and inlet check valve 15 to fill chamber 11 and chamber 21. Supplying heat by means of element 17 starts the cycle. The pressure in chamber 21, caused by the vaporization of the fluid or the expansion of the gas due to heating, forces the cold fluid at the bottom of chamber 21, past outlet check valve 16, through pipe 22 into jacket 23 and upon contact with the heated chamber 21 chills or cools it. This cooling causes a condensation of the vapor, or a reduction of the volume of the gas in chamber 21, thus, a drop in internal pressure below that of external pressure or atmospheric pressure and as a result a refilling of chambers 11 and 21 which thus, completes a cycle of operation. This unit will keep cycling repeatedly while heat is supplied continuously to the working substance. The advantages in this embodiment are:

(1) The heat energy developing the motive power is contained and concentrated in the upper end of chamber 21, and only the heat that has done its work by expansion is being disposed of.

(2) It is comparatively simple to insulate to prevent radiant heat losses.

(3) The working fluid may be different than the fluid being pumped, provided that it is of a lower specific gravity and is not soluble with the fluid pumped and will recondense.

Referring to FIG. 7, there is illustrated a device quite similar to the embodiment shown in FIG. 6, however, in this embodiment chamber 21 is divided by a diaphragm 25 into chambers A and B, thus permitting the charge of a fluid above diaphragm 25 in chamber A in which the fluid may have a higher or lower specific gravity and be soluble with the pumped fluid but more volatile and the normal charge of fluid may be below diaphragm 25 in chamber B. The operation of this embodiment will be exactly the same as described in FIG. 6. The diaphragm 25 simply pulsing with the vapor pressure of fluid being vaporized above the diaphragm to work on the fluid below the diaphragm and moving upward with the drop in pressure caused by the condensation of vapor above the diaphragm and returning to the position illustrated in FIG. 7, with the refilling of chambers 11 and 21 by atmospheric pressure.

In operation FIG. 8 is identical to FIG. 5. The only difference is chamber 11 is in a vertical rather than a horizontal plane.

In the embodiments of this invention shown we may consider for example, the fluid as simply water, however, if the thermal efficiency of the device is to be considered there are certain variations that may be utilized to increase the efficiency of the device; for example, although FIG. 6 is normally charged with water where a pump is used to pump water, it is possibe to charge the upper portion of chamber 21 with a fluid being more volatile and having a lower boiling point than water and of course a lower specific gravity, due to the fact that it is insoluble in water it retains its separation from the water during its cycling action, it will provide the same pumping action, but a higher thermal efficiency in operation. A further variation is provided in FIG. 7, in which chamber 21 is divided by a diaphragm into two separate chambers A and B. In this construction various more volatile fluids, having a lower boiling point and of a different specific gravity, may be utilized in chamber A, for this reason, the fluid used in chamber A cannot be dissolved or intermingled or absorbed by the water passing through chamber 11 and charging chamber B. Similarly in FIGS. 1, 5 and 8, a diaphragm may be employed if desired.

There are certain limits of thermal efficiency; Carnot eff. is given as:

$$\text{Carnot eff.} = 1 - \frac{T_2}{T_1}$$

where $T_1$ is absolute temperature of heat supplied to the engine and $T_2$ is the absolute temperature of heat at which it is exhausted. In the embodiments shown in FIGS. 1, 5 and 8, $T_2$ (exhaust temperature) is the boiling point of the fluid, and in the embodiment shown in FIGS. 6 and 7 when the working substance is a gas (such as helium) $T_2$ or exhaust temperature is the temperature of the fluid being pumped by the expansion of the gas in chamber 21. The thermal efficiency of this device varies with the form, working substance and the temperatures of heat source; for example; according to Carnot Theory a model operating with water (boiling point 212°) whether it be an open system, or a closed system, and with the necessary heat dissipation rate, and with the heat supplied. For example, at a temperature of 530° F. (using the Rankine Scale), we might anticipate The possible $$\text{Thermal eff.} = 1 - \frac{212+459}{530+459} = 32.2\%$$

(if thermal losses are held to a minimum).

A further example using the same model with water but in this instance increasing the heat supplied to 2000° F. (using the Rankine Scale).

The possible $$\text{Thermal eff.} = 1 - \frac{212+459}{2000+459} = 72.7\%$$

A further example of the thermal efficiency obtainable may be provided by referring to FIG. 7, and in this instance, the fluid charged into chamber A would be Trichloromonofluoromethane (or Freon 11) whose boiling point is 75.3° F. and the temperature of heat supplied is 530° F., according to the Rankine Scale.

$$\text{Eff.} = \frac{75+459}{530+459} = 47\%$$

A further example using the same model (FIG. 7), with the same Freon 11, but in this instance, increasing the heat supplied to 2000° F., using the Rankine Scale.

The possible $$\text{Thermal eff.} = \frac{75+459}{2000+459} = 78\%$$

The heat energy required to produce a change of state, (in the case of liquids) or the heat of vaporization of the fluid in recurring cycles remains, in the case of FIG. 1, as residual heat in the fluid being recirculated and in the case of FIGS. 5, 6, and 7, as residual heat in the fluid trapped because of the physical configuration.

In an embodiment using FIG. 1, when the heated fluid is recirculated back to the supply vessel 19, the heat dissipation rate can be controlled by cooling the fluid in the supply vessel. In the case of FIGS. 5 and 8 the rate of heat dissipation can be controlled by varying the angular position of the heating chamber 11A below the horizontal plane and the cooling of the fluid in the supply vessel. In the case of FIGS. 6 and 7, the rate of heat dissipation can be controlled by the quantity of coolant fluid coming in physical contact with the heating chamber 21.

The thermal efficiency of this device depends upon four factors:

(1) Temperature of heat supplied.
(2) The boiling point and volatility of the fluid heated.
(3) The radiant and frictional losses.
(4) The internal heating chamber pressure if a closed system.

In the embodiments illustrated, although chambers 11 and 21 have been shown in a round form, such as a pipe, this is not a necessary form and is not intended to limit the design of chamber 11, as it may readily be formed square, rectangular, triangular, or any configuration, and any dimension, without departing from this invention, it is also to be noted that the heating element 17, provided in all embodiments, may of course, by any type of heat not necessarily an electrical element and the cycle of operation may be varied according to the degree of heat supplied. Also, it is to be noted, that the heat applied is a continuous supply which produces the pumping or cycling action, however, an intermittent supply of heat may also be employed with a modification.

It is also to be noted, that unlike all of the devices in the prior art which are formed with a boiler and separate condenser, this invention provides a single chamber which is the boiler and is also the condenser. This combination permits a lower cost. The single chamber illustrated in FIG. 1, is also true in FIG. 5, even though the configuration has changed and is true in FIGS. 6 and 7, even though the configuration and size of chamber has changed. Various changes may be made in the size and shape of the chamber 11 and of the type of heat and degree of heat applied without departing from the spirit of this invention and this invention shall be limited only by the appended claims.

What is claimed is:

1. A heat actuated thermal cycling fluid pump comprising a single fluid chamber, in which all thermodynamic action takes place, said chamber having an upper portion, an inlet port with a check valve and and an outlet port with a check valve, said chamber provided with a heating source operatively associated with said upper portion only providing by a rapid transfer of heat an energy input to the fluid, said fluid absorbing the thermal energy adjacent said upper portion of said chamber to start a thermal cycle by raising the temperature of said fluid in this area to the boiling point of said fluid, the boiling of a minimum quantity of said fluid vaporizing it in said upper portion to produce a sudden pressure pulse for each cycle, said pressure pulse forcing fluid from said chamber out of said outlet port past said check valve, said pulse resulting in a decrease in the internal chamber pressure to below the pressure exerted by the supply fluid thus providing the means for more fluid to be charged through the inlet port and check valve to refill said chamber and complete a cycle, said cycle repeating rapidly as long as the heat source provides the necessary thermal energy.

2. In a device according to claim 1 in which the heat is applied continuously and a periodic cycle of fluid pumping is established.

3. In a device according to claim 1 in which the fluid chamber is an elongated horizontal chamber.

4. In a device according to claim 1 in which the fluid chamber is a single chamber having the general configuration of a T and in which the head of the T is positioned in a horizontal plane with the check valves at either end and in which the heater is applied to the upper surface of the leg of the T and in which the leg of the T may be positioned in a horizontal plane or at a slight angle below the horizontal plane.

5. In a device according to claim 1 in which the fluid chamber is a single chamber having the configuration of a T and in which the head of the T is positioned in a vertical position with the check valves at either end and in which the leg of the T is positioned in a horizontal position and the heater is applied to the upper surface.

6. A heat actuated thermally cycling fluid pump comprising a fluid chamber of any physical configuration which provides any suitable upper portion therein serving as the area in which heat is absorbed by the working fluid, and in which all thermodynamic action takes place, said chamber having an inlet port with a check valve and an outlet port with a check valve, said chamber provided with a heating source operatively associated with said upper portion only, providing by a rapid transfer of heat an energy input to the fluid absorbing the thermal energy in said upper portion to start a thermal cycle by raising the temperature of said fluid by said transfer of heat in this portion to the boiling point of the fluid, the boiling of a minimum quantity of said fluid, vaporizing it in said upper portion to produce a sudden pressure pulse for each cycle, said pressure pulse forcing fluid from said chamber out of said outlet port past said check valve, said pulse resulting in a decrease in the internal chamber pressure to below the pressure exerted by the supply fluid thus providing the means for the entry of the supply fluid through the inlet port and check valve to refill said chamber and complete a cycle, said cycle repeating rapidly as long as the heat source provides the necessary thermal energy.

References Cited in the file of this patent

UNITED STATES PATENTS

| | | | |
|---|---|---|---|
| 77,090 | Prall | Apr. 21, | 1868 |
| 137,765 | Brock | Feb. 11, | 1875 |
| 212,267 | Rogers | Feb. 11, | 1879 |
| 1,492,153 | Van Hise | Apr. 29, | 1924 |
| 2,241,620 | Shoeld | May 13, | 1941 |
| 2,429,940 | | | |
| 2,744,470 | | | |
| 2,763,246 | | | |
| 2,853,953 | | | |
| 2,954,741 | | | |
| 2,969,747 | | | |
| | McDaniel | Oct. 28, | 1947 |
| | Coleman | May 8, | 1956 |
| | Raskin | Sept. 18, | 1956 |
| | Hallman | Sept. 30, | 1958 |
| | Kleen | Oct. 4, | 1960 |
| | MacCracken | Jan. 31, | 1961 |

FOREIGN PATENTS

| | | | |
|---|---|---|---|
| 355,001 | Germany | June 19, | 1922 |
| 1,128,445 | France | Jan. 4, | 1957 |